United States Patent [19]
Mishiro

[11] Patent Number: 4,856,391
[45] Date of Patent: Aug. 15, 1989

[54] ULTRASONIC OSCILLATION MACHINING APPARATUS

[75] Inventor: Shoji Mishiro, Kawasaki, Japan
[73] Assignee: Taga Electric Co., Ltd., Tokyo, Japan
[21] Appl. No.: 185,051
[22] Filed: Apr. 22, 1988
[30] Foreign Application Priority Data
  May 13, 1987 [JP] Japan ................ 62-116186
[51] Int. Cl.$^4$ .............................................. B23B 21/00
[52] U.S. Cl. ........................................ 82/137; 82/904; 82/158
[58] Field of Search ............... 82/24 R, 36 R, D9; 29/D46

[56] References Cited

U.S. PATENT DOCUMENTS

| | | | |
|---|---|---|---|
| 3,174,404 | 3/1965 | Findley | 82/109 |
| 3,739,665 | 6/1973 | Kumabe et al. | 82/36 R |
| 3,859,876 | 1/1975 | Shimizu et al. | 82/36 R |
| 4,602,540 | 7/1986 | Murotushi et al. | 82/24 R |

*Primary Examiner*—Frederick R. Schmidt
*Assistant Examiner*—Robert Showalter
*Attorney, Agent, or Firm*—Oblon, Spivak, McClelland, Maier & Neustadt

[57] ABSTRACT

The present invention provides an ultrasonic oscillation machining apparatus wherein accurate oscillation machining can be attained using a small vertical ultrasonic oscillating element which oscillates with a high frequency. The ultrasonic oscillation machining apparatus comprises a wide oscillating body divided into a plurality of units by one or more slits formed in said wide oscillating body with opposite end portions left thereon, a plurality of vertical ultrasonic oscillating elements secured to one end faces of said individual units of said wide oscillating body for producing vertical oscillations of such a frequency that said opposite end portions of said wide oscillating body are positioned at loop portions of oscillations of the wide oscillating body, and a bite provided at one of said end portions of said wide oscillating body which is positioned at one of the loop portions of oscillations of said wide oscillating body. The bite is driven with a high output power by vertical oscillations composite of oscillations produced by the individual vertical ultrasonic oscillating elements.

11 Claims, 4 Drawing Sheets

ULTRASONIC OSCILLATION MACHINING APPARATUS

FIELD OF THE INVENTION AND RELATED ART STATEMENT

This invention relates to an ultrasonic oscillation machining apparatus for use with a lathe, a shaper or a planer wherein ultrasonic oscillation is utilized to machine a workpiece, and more particularly to an ultrasonic oscillation machining apparatus of the type mentioned which employs a vertical ultrasonic oscillating element.

Conventionally, there are ultrasonic oscillation machining apparatus which utilize ultrasonic oscillation to machine a workpiece. In lathes, for example, there is a type wherein a bite is mounted at an end of a bite shank which makes flexural oscillation and the bite is caused to make ultrasonic oscillations in a tangential direction to the work to machine the workpiece. It is known that this type of oscillation machining effect can be obtained by an arrangement of the type mentioned just above such that the machining resistance is reduced remarkably and the dimensional accuracy is improved.

An example of such ultrasonic oscillation machining apparatus as described above will be described with reference to FIG. 1. At first, a bite shank 2 serving as an oscillating body is securely mounted at an upper part of a tool rest 1 by means of a clamp jig 3. The clamping direction by the claim jig 3 is in the vertical direction while the clamping positions are node portions of oscillating (positions $N_1$ and $N_2$ at which the two long and short dashed lines intersect). Meanwhile, the clamp jig 3 which is positioned above the bite shank 2 is held from above by a holding plate 4 and that is secured by the bolts 5.

Subsequently, a bite 7 serves as a tool which faces a workpiece 6 which is securely mounted at an end of one side of the bite shank 2. The bite 7 is securely mounted on the bite shank 2, for example, by silver-alloy brazing. Further, a vertical ultrasonic oscillating element 8 is securely mounted at the other end portion of the bite shank 2 at a loop portion of oscillations of the bite shank 2 (position L on one of the long and short dash lines) by way of an oscillation magnifying horn 9. The vertical ultrasonic oscillating element 8 is of a structure wherein ultrasonic oscillations are produced in a direction of its axis. Meanwhile, the oscillation magnifying horn 9 is provided to magnify the magnitude of ultrasonic oscillations of the vertical ultrasonic oscillating element 8.

With the ultrasonic oscillation machining apparatus is constructed as described above, if the vertical ultrasonic oscillating element 8 is driven by an ultrasonic oscillating device (not shown), the bite shank 2 will resonate with oscillations as indicated by the long and short dash lines in FIG. 1. Consequently, the end of the bite 7 is oscillated in a tangential direction to the workpiece 6 so that it machines the workpiece 6. It is to be noted that, in this instance, the oscillation machining effect appears effectively when the requirement $v < 2\pi fa$ is met where v denotes a speed at which the work is machined, f denotes an oscillation frequency of the bite 7, and a denotes a magnitude of oscillations.

Now, problems of such a conventional arrangement as described above will be described.

First of all, the conventional arrangement has a drawback that where a high degree of accuracy in machining operation is required, it is not possible. Machining of a higher. In particular, with a machining apparatus which utilizes ultrasonic oscillation, the machining resistance is reduced remarkably and the accuracy in machining is improved as described hereinabove. To the contrary, since machining of a higher degree of accuracy is possible if the oscillation frequency is raised, it is necessary to raise the oscillation frequency in order to attain a higher degree of accuracy in machining. To this end, the oscillation system including the vertical ultrasonic oscillating element 8 and the bite shank 2 may be reduced in size. However, if the vertical ultrasonic oscillating element 8 is reduced in size, then the output power thereof will naturally be reduced, and even if an auxiliary measure such as provision of the magnitude magnifying horn 9 is taken, a sufficient oscillation machining effect may not be attained consequently. Particularly, in the case of an ultrasonic oscillation machining apparatus, as shown in FIG. 1, it is difficult to raise the resonance frequency beyond 30 KHz.

Secondly, the conventional arrangement has a drawback in that it is difficult to mount the bite shank 2 on the tool rest 1. In particular, if the claim jig 3 is not correctly positioned to clamp the shank 2 at the node portions ($N_1$ and $N_2$) energy losses will appear and the end of the blade of the bite 7 may be displaced from the correct direction of oscillations so that not only is the oscillation machining effect reduced but other harmful results may be brought about. Accordingly, the bite shank 2 must be mounted with a great deal of accuracy on the clamp jig 3, and complicated handling and great care are required for exchanging of the bite shank 2.

Thirdly, the conventional arrangement has a drawback that, where different types of bites 7 are used, complicated handling is required for exchanging of the bites 7. In particular, since the bite 7 is securely mounted on the bite shank 2 by silver-alloy brazing or a like means, in order to allow use of another bite 7 of a different type, the entire bite shank 2 must be remounted on the clamp jig 3.

OBJECTS AND SUMMARY OF THE INVENTION

It is a first object of the present invention to provide an ultrasonic oscillation machining apparatus wherein a machining operation with a higher degree of accuracy can be made.

It is a second object of the present invention to provide an ultrasonic oscillation machining apparatus wherein an oscillating body can be mounted readily on an oscillating body holder.

It is a third object of the present invention to provide an ultrasonic oscillation machining apparatus wherein an oscillating body can be mounted with a high degree of accuracy on an oscillating body holder.

It is a fourth object of the present invention to provide an ultrasonic oscillation machining apparatus wherein an exchanging operation can be made readily when a bite of a different type is to be used.

It is a fifth object of the present invention to provide an ultrasonic oscillation machining apparatus wherein a bite will not be displaced by oscillations thereof.

In order to attain the objects, according to the present invention, an ultrasonic oscillation machining apparatus comprises a wide oscillating body divided into a plurality of units by one or more slits formed in said wide oscillating body with opposite end portions left thereon, a plurality of vertical ultrasonic oscillating elements secured to one end faces of said individual units of said wide oscillating body for producing vertical oscillations of such a frequency that said opposite end portions of said wide oscillating body are positioned at loop portions of oscillations of said wide oscillating body, and a bite provided at one of said end portions of said wide oscillating body which is positioned at one of the loop portions of oscillations of said wide oscillating body. With the ultrasonic oscillation machining apparatus of this invention, resonant oscillations produced in the individual units are transmitted to a bite positioned at the loop portion of the oscillations so that strong vibrations are produced in the bite. Consequently, a great output power can be provided, this enables reduction in the size of the individual units so that a high frequency of oscillations can be obtained. Accordingly, accurate oscillation machining can be made with higher frequency oscillations.

Further, where a plurality of depressions are formed at node portions of oscillations of said wide oscillating body and the wide oscillating body is held on an oscillating body holder which includes a plurality of tightening elements which are provided at positions for fitting engagement with said depressions and applying a tightening force in a direction towards said depressions, an operation of mounting the wide oscillating body on the oscillating body holder can be made easy because the fixing position is determined in advance by the depressions.

In addition, where the bite is removably mounted on said wide oscillating body by means of a resonant bar which resonates vertically in an integral relationship with said wide oscillating body and clamps said bite, even if a structure for allowing for the removable mounting of the bite is employed, the bite is secured in a stabilized condition due to oscillation inertia of the resonant bar. Accordingly, an exchanging operation of various types of bites can be performed readily and rapidly.

DESCRIPTION OF THE PREFERRED EMBODIMENTS

Figure 1:
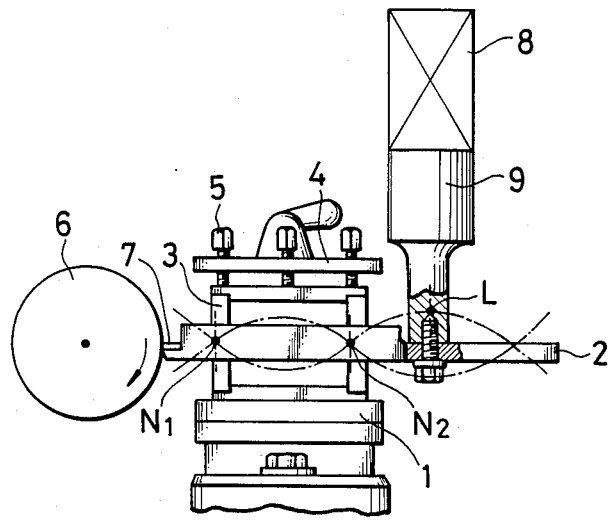
FIG. 1 is a side elevational view, partly broken, showing a conventional ultrasonic oscillation machining apparatus.
Figure 2A:
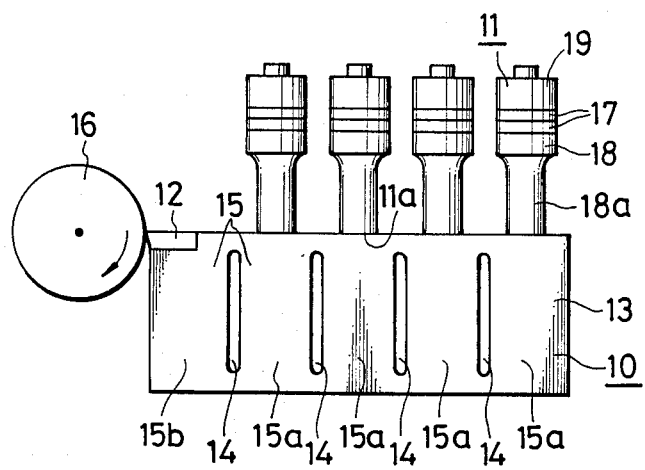
FIG. 2a and FIG. 2b are side elevational views showing an ultrasonic oscillation machining apparatus of a first embodiment of the present invention together with a manner of oscillations of the same.
Figure 2B:
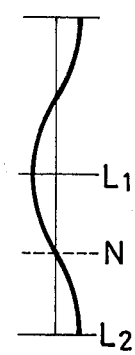

The first embodiment of the present invention will be described with reference to FIG. 2(a) and FIG. 2(b). The ultrasonic oscillation machining apparatus of the present embodiment generally includes, for example, four vertical ultrasonic oscillating elements 11 and a bite 12 which are all secured to a wide oscillating body 10.

Description will now be given of the wide oscillating body 10. The wide oscillating body 10 includes an oscillator member 13 in the form of a parallelepiped made of a metal material. The oscillator member 13 has up to four slits 14 of the same shape and the same size formed in parallel to each other therethrough between opposite side faces thereof except upper and lower end portions of the slits 14. The oscillator member 13 is thus constituted as the wide oscillating body 10 which is divided into five units 15 by the slits 14. Here, in a general idea, the units 15 are further divided into two groups including resonant units 15a to which the vertical ultrasonic oscillating elements 11 are secured and a machining unit 15b to which the bite 12 is secured. The machining unit 15 is a unit 15 which is located at a specific position at which it opposes to a work 16 which will be hereinafter described on the wide oscillating body 10 while the resonant units 15a are units 15 which are located at positions other than the specific position.

Subsequently, each of the vertical ultrasonic oscillating element 11 is of a structure wherein a pair of piezo-electric elements 17 are clamped in an integral relationship between and fastened to a metal member 18 and a backup member 19. The metal member 18 has a step portion 18a thereon. Each of the vertical ultrasonic oscillating elements 11 of such a structure as described above has an output end portion 11a contacted with and secured to a corresponding one of upper faces of the resonant units 15a by means of a bolt or the like.

Next, the bite 12 is a structure which is formed into a unitary member as a tip. The bite 12 is securely mounted on an upper face of the machining unit 15b by silver-alloy brazing or a like means.

Here, each of the vertical ultrasonic oscillating elements 11 are formed so as to have a length equal to a half wavelength in its axial direction as seen in (b) of FIG. 2. The resonant units 15a which are resonantly oscillated by the vertical ultrasonic oscillating elements 11 are designed such that they may resonate with a half wavelength in the axial directions of the vertical ultrasonic oscillating elements 11. Further, the entire wide oscillating body 10 is designed such that opposite end portions thereof may be positioned at loop portions ($L_1$ and $L_2$) of oscillations of the oscillating body 10 and the central portion of the wide oscillating body 10 may be positioned at a node portion (N) of oscillations of the oscillating body 10.

With the ultrasonic oscillation machining apparatus of such a construction as described above, if the electric driving means for the individual vertical ultrasonic oscillating elements 11 are connected in parallel and the piezo-electric elements 17 are driven with a resonance frequency by an oscillator not shown, vertical oscillations are produced in the vertical ultrasonic oscillating elements 11. Thereupon, the step portions 18a of the metal members 18 magnify the magnitude of oscillations of the vertical ultrasonic oscillating elements 11. The vertical oscillations produced in this manner in the vertical ultrasonic oscillating elements 11 are transmitted independently to the four resonance units 15a to which the output end portions 11a of the vertical ultrasonic oscillating elements 11 are connected. Consequently, upper and lower end portions of the resonant units 15a will be oscillated in up and down directions in synchronism with the transmitted oscillations, and the oscillations of the resonant units 15a are transmitted to the machining unit 15b. Accordingly, the bite 12 which is securely mounted on the upper face of the machining unit 15b is caused to make ultrasonic oscillations, and as the bite 12 is contacted with the workpiece 16 which is rotating in the direction of an arrow mark, thereby machining the workpiece by oscillation machining.

Meanwhile, the oscillations made by the bite 12 are oscillations composite of oscillations are the produced by the four vertical ultrasonic oscillating elements 11 and have a high output power. Therefore, even if the individual vertical ultrasonic oscillating elements 11 are reduced in size to raise the resonance frequency of the resonant units 15a, it is possible to provide sufficient output power from the end of the bite 12. Accordingly, an increase of the resonance frequency of the bite 12 by the improvement of the resonance frequency of the resonant units 15a can be made readily, which contributes to improvement in accuracy in the machining operation of the workpiece 16.

Meanwhile, upon production of oscillations, resonant oscillations are produced wherein a wavelength is defined by an upper end face of the backup member 19 of the vertical ultrasonic oscillating element 11 and a lower end face of the wide oscillating body 10. Such resonant oscillations have loop portions ($L_1$ and $L_2$) of oscillations at upper and lower end portions of the wide oscillating body 10, and a node portion (N) of oscillations at the central portion of the wide oscillating body 10. Thus, as for oscillations of the wide oscillating body 10, the upper and lower end portions of the wide oscillating body 10 are oscillated uniformly in the up and down directions so that a deviations in the oscillations appearing at the bite 12 is prevented. Further, since the bite 12 is positioned at one of the loop portions ($L_1$) of oscillations at which the oscillations present a maximum displacement, the output power of the end of the bite 12 is increased further.

Further by way of an illustrative example, a wide oscillating body 10 was formed using an oscillator member 13 made of a titanium alloy having a width of 100 mm, a height of 38 mm and a thickness of 16 mm, and vertical ultrasonic oscillating elements 11 having a diameter of $\phi 7$ mm at a step portion 18a thereof and a diameter of $\phi 15$ mm at the other portion thereof were used. The results were: the resonance frequency was 65 KHz; the magnitude of oscillations of the tip including the bite 12 was 10 $\mu m^{P-P}$; and the maximum output power was 150 W.

Figure 3A:
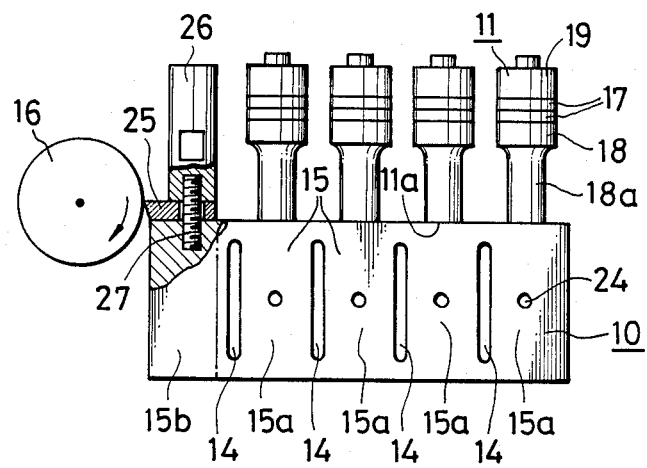
FIG. 3a and FIG. 3b are side elevational views, partly broken, showing an ultrasonic oscillation machining apparatus of a second embodiment of the present invention together with a manner of oscillations of the same.
Figure 3B:
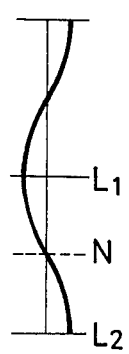
Figure 4:
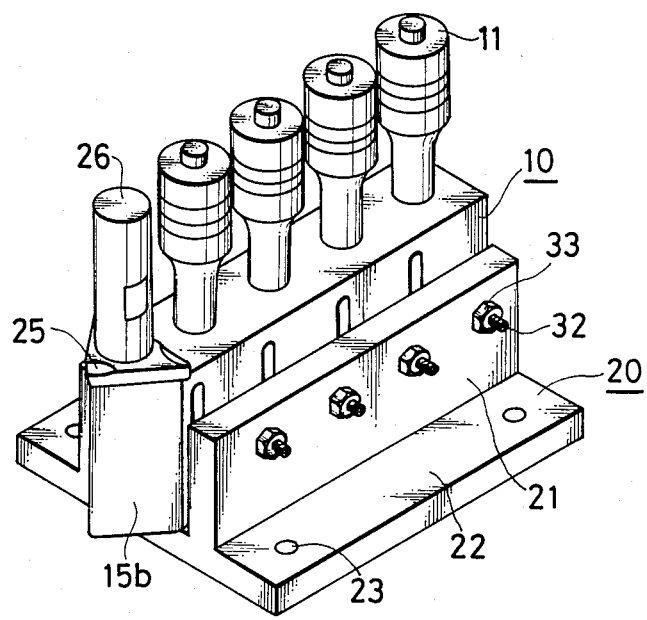
FIG. 4 is a perspective view of the ultrasonic oscillation machining apparatus of FIG. 3 including an oscillating body holder.
Figure 5:
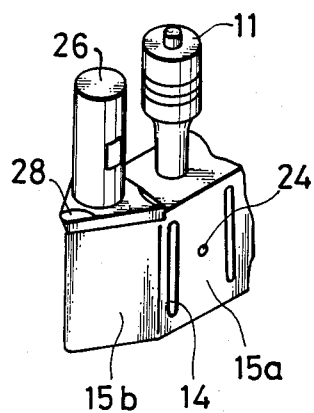
FIG. 5 is a perspective view showing a concrete example of the shape of a machining unit and the shape of a tip.

Subsequently, a second embodiment of the present invention will be described with reference to FIGS. 3 to 5. Like parts are denoted by like reference numerals to those of the first embodiment, and overlapping description thereof will be omitted herein (this also applies to a following embodiment).

In mounting a blade for oscillation machining on an oscillating body, it may be recommended to employ a structure wherein a screw is used to removably mounting the blade on the oscillating body. This is intended to enable rapid mounting of a blade of a type suitable for a type of machining. However, if such a structure is employed, a force equal to the product of a mass of the blade and an oscillation acceleration is applied to connecting faces of the blade and the oscillating body. Accordingly, setting aside the case wherein the magnitude of oscillation is small, in the magnitude of oscillations in a practical range, the connection between the blade and the oscillating body becomes unstable and consequently a stabilized oscillation machining effect cannot be obtained. Therefore, the blade must be securely mounted on the oscillating body by silver-alloy brazing or by a like means, which makes it necessary to exchange the entire oscillating body in order to exchange the blade in other systems. Besides, in order for the oscillating body to be carried on the holder for exchanging of the oscillating body, it is necessary for node portions of the oscillating body to be supported accurately on the holder. This is intended to prevent energy loss and extraordinary oscillations at the blade portion. Therefore, an exchanging operation of the oscillating body is troublesome and great care is required, and besides accurate positioning of the oscillating body is still difficult. Those problems are resolved by the present embodiment. The present embodiment will be described now.

The ultrasonic oscillation machining apparatus of the present embodiment includes an oscillating body holder 20 for securing a wide oscillating body 10 thereto. The oscillating body holder 20 includes a base plate 22 and a pair of side plates 21 provided vertically uprightly in a spaced relationship by a fixed distance on the base plate 22. Further, each of the side plates 21 has up to eight threaded holes formed therein though not shown, and a cone point bolt 32 is screwed in each of the threaded holes of the side plates 21 of the oscillating body holder 20. The cone point volt 32 has a lock nut 33 screwed thereon and serves as a tightening element. Each of the cone point bolts 32 is a bolt which is conically pointed at an end thereof. It is to be noted that the base plate 22 of the oscillating body holder 20 has a plurality of holes 23 formed therein for securing the same to a slide table or the like by means of bolts.

Next, conical depressions 24 are formed on opposite side faces of individual resonant units 15a of the wide oscillating body 10 secured in position by the oscillating body holder 20. As seen in (b) of FIG. 3, all of the depressions 24 are located at node portions (N) of oscillations of the wide oscillating body 10. Here, the conical point bolts 32 provided on the oscillating body holder 20 are positioned such that the end portions thereof may be fitted in the individual depressions 24. Thus, as the conical point bolts 32 are tightened firmly until they are fitted in the depressions 24 and locked by the nuts 33, the wide oscillating body 10 is held on the oscillating body holder 20. Besides, the conical point bolts 32 and the depressions 24 are formed such that they may be fitted with each other substantially in a point-contacted condition.

Figure 6:
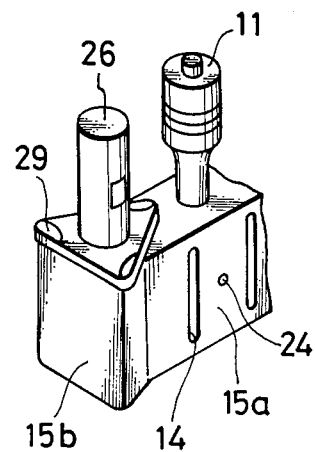
FIG. 6 is a perspective view showing another example of the shape of a machining unit and the shape of a tip.
Figure 7:
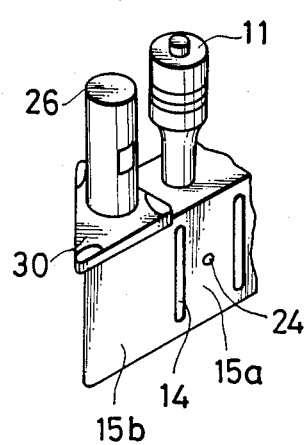
FIG. 7 is a perspective view showing a further example of the shape of a machining unit and the shape of a tip.
Figure 8:
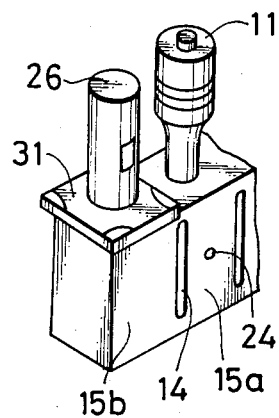
FIG. 8 is a perspective view showing a still another example of the shape of a machining unit and the shape of a tip.

Meanwhile, a machining unit 15b of the wide oscillating body 10 has such a structure that the bite 12 can be removably mounted thereon. In particular, the structure is such that the bite 12 is constituted as a tip 25, and the tip 25 is clamped on an upper face of the machining unit 15b by means of a resonant bar 26 and is secured firmly by means of a bolt 27. Here, the tip 25 is positioned at a loop portion ($L_1$) of oscillations. Meanwhile, the structure is also such that the resonant bar 26 resonates with a half wavelength in the longitudinal direction thereof in response to oscillations of the wide oscillating body 10. Further, in recent years, tips of various shapes such as regular triangular tips 28, 29 and 30 and a regular square tip 31 have been placed on the market as throw-away tips for the tip 25. Thus, in the present embodiment, the shape of the machining unit 15b may be varied in accordance with the shape of the tip. Concrete examples are shown in FIGS. 5 to 8. FIG. 5 shows a shape of the machining unit 15b on which a regular triangular tip 28 is mounted, and FIGS. 6 and 7 show shapes of the machining unit 15b on which regular triangular types 29 and 30 are mounted in different mounting angles while FIG. 8 shows a shape of the machining unit 15b on which a regular square tip 31 is mounted.

With such a construction as described just above, first of all, an exchanging operation of the bite 12 becomes very easy. In particular, the tip 25 constituting the bite 12 is connected in a stable condition to the machining unit 15b due to oscillation inertia of the resonant bar 26 and the machining unit 15b which clamp the tip 25 therebetween. Accordingly, even if a structure wherein the bite 12 is removably mounted on the wide oscillating body 10 is employed, it will not cause such an inconvenience that the oscillation machining effect is deteriorated. Accordingly, upon exchanging of the bite 12, such a troublesome operation as mounting or dismounting of the wide oscillating body 10 itself on or from the oscillating body holder 20 becomes unnecessary, and various types of machining operations which required exchanging of the bite 12 can be made readily and rapidly.

Secondly, a mounting or dismounting operation of the wide oscillating body 10 on or from the oscillating body holder 20 becomes easy. In particular, such an operation is made by fitting the conical point bolts of the oscillating body holder 20 into the depressions 24 of the wide oscillating body 10. Accordingly, the mounting position of the wide oscillating body 10 on the oscillating body holder 20 is determined in advance so that the operation can be made readily and rapidly. Besides, since the conical point bolts 32 and the depressions 24 contact with each other substantially in a point-contacted condition, positioning becomes accurate, and fixation of the wide oscillating body 10 becomes firm.

Figure 9:
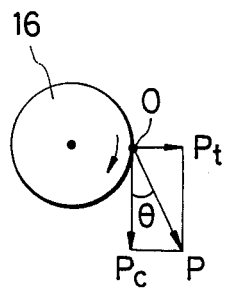
FIG. 9 is a side elevational view illustrating components of force upon machining by an ultrasonic oscillation machining apparatus of a third embodiment of the present invention.
Figure 10:
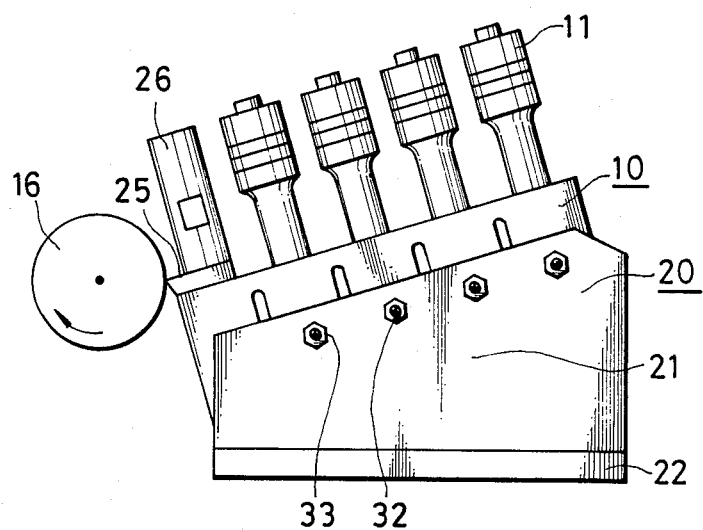
FIG. 10 is a side elevational view showing the ultrasonic machining apparatus of the third embodiment of the present invention.

Now, a third embodiment of the present invention will be described with reference to FIGS. 9 and 10. In case a bite 12 is contacted at the right angle with a work 16 as in the first or second embodiment described above, the oscillation machining effect is often deteriorated due to a back component of force Pt of a machining resistance which is produced at the right angle relative to the machining direction upon machining. In particular, at a contact point O between the bite 12 and the work 16, a radial back component of force Pt which is directed in the direction of the bite 12 is produced in addition to a main component of force Pc in the tangential direction to the work 16. As a result, a resultant force P which is displaced by an angle $\theta$ from the direction of the main component of force Pc acts upon the bite 12 to cause harmful extraordinary oscillations, and consequently a sufficient oscillation machining effect cannot be attained. Thus, in the present embodiment, a wide oscillating body 10 is mounted in an inclined condition on a side plate 21 of an oscillating body holder 20 so that the contacting angle of the bite 12 with the work 16 may be inclined as seen in FIG. 10. The inclination angle here is equal to the angle $\theta$ of displacement of the resultant force P from the main component of force Pc. Consequently, the direction of the resultant force P of the machining resistance coincides with the direction of oscillations of a tip 25 so that the influence of the back component of force Pt is removed. Accordingly, oscillation machining can be made efficiently.

What is claimed is:

1. An ultrasonic oscillation machining apparatus, comprising:
   a wide oscillating body divided into a plurality of units by one or more slits formed perpendicularly to the longer side of said body when viewed in cross-section such that end portions are left in said wide oscillating body;
   a plurality of vertical ultrasonic oscillating elements wherein at least one of which is secured to each one of the portions of said wide oscillating body which forms the said individual units, of said wide oscillating body, for producing vertical oscillations of a frequency such that said opposite end portions of said wide oscillating body are positioned at loop portions of the oscillations so produced in said wide oscillating body; and
   a bite provided at one of said end portions of said wide oscillating body which is positioned at a loop portion of the oscillations of said wide oscillating body.

2. An ultrasonic oscillation machining apparatus according to claim 1, wherein said wide oscillating body has up to four slits formed therein to define up to five units.

3. An ultrasonic oscillation machining apparatus according to claim 1, wherein the central portion of each of said units of said wide oscillating body is positioned at a node portion of oscillations of said wide oscillating body.

4. An ultrasonic oscillation machining apparatus according to claim 3, wherein the distance between opposite end portions of each of said units of said wide oscillating body is equal to one wavelength.

5. An ultrasonic oscillation machining apparatus according to claim 1, wherein said bite is securely mounted on said wide oscillating body.

6. An ultrasonic oscillation machining apparatus according to claim 1, wherein said bite is removably mounted on said wide oscillating body by means of a resonant bar which resonates vertically in an integral relationship with said wide oscillating body and clamps said bite.

7. An ultrasonic oscillation machining apparatus according to claim 6, wherein said resonant bar is screwed to said wide oscillating body by way of said bite.

8. An ultrasonic oscillation machining apparatus according to claim 6, wherein said resonant bar is set with such a length as to cause said resonant bar to resonate with a half wavelength.

9. An ultrasonic oscillation machining apparatus, comprising:
   a wide oscillating body divided into a plurality of units by one or more slits formed perpendicular to the longer side of said wide oscillating body when viewed in cross-section such that opposite end portions are left in said wide oscillating body;

a plurality of vertical ultrasonic oscillating elements secured to one end portions corresponding to said individual units of said wide oscillating body, for producing vertical oscillations of a frequency such that said opposite end portions of said wide oscillating body are positioned at a loop portion of the oscillations of said wide oscillating body;

a bite provided at one of said end portions of said wide oscillating body which is positioned at a loop portion of the oscillations of said wide oscillating body;

a plurality of depressions formed at node portions of oscillations of said wide oscillating body; and an oscillating body holder including a plurality of tightening elements which are provided at positions for fitting engagement with said depressions and applying a tightening force in a direction toward said depressions.

10. An ultrasonic oscillation machining apparatus according to claim 9, wherein said depressions are formed in a conical shape while ends of said tightening elements are sharpened into such a shape as to allow said ends of said tightening elements to be fitted into said depressions.

11. An ultrasonic oscillation machining apparatus comprising;

a wide oscillating body divided into a plurality of units by one or more slits formed perpendicular to the longer side of said wide oscillating body when said body is viewed in cross-section such that end portions are left in said wide oscillating body;

a plurality of vertical ultrasonic oscillating elements wherein at least one of which is secured to each one of the portions of said wide oscillating body which forms the end faces of each of said individual units, of said wide oscillating body, for producing vertical oscillations of a frequency such that said opposite end portions of said wide oscillating body are positioned at loop portions of the oscillations so produced in said wide oscillating body; and a removable bite mounted on said wide oscillating body by means of a resonant bar, which resonates vertically in an integral relationship with said wide oscillating body and which clamps said bite to said wide oscillating body at a position that is a loop portion of the oscillations of said wide oscillating body.

* * * * *